(12) United States Patent
Yiu

(10) Patent No.: US 11,019,655 B2
(45) Date of Patent: May 25, 2021

(54) ADVERTISEMENT OF NR CAPABILITY TO USER EQUIPMENT

(71) Applicant: Apple Inc., Cupertino, CA (US)

(72) Inventor: Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/473,577

(22) PCT Filed: Jan. 11, 2018

(86) PCT No.: PCT/US2018/013347
§ 371 (c)(1),
(2) Date: Jun. 25, 2019

(87) PCT Pub. No.: WO2018/136298
PCT Pub. Date: Jul. 26, 2018

(65) Prior Publication Data
US 2020/0045731 A1 Feb. 6, 2020

Related U.S. Application Data

(60) Provisional application No. 62/448,146, filed on Jan. 19, 2017.

(51) Int. Cl.
| | | |
|---|---|---|
| *H04W 4/00* | (2018.01) | |
| *H04W 74/00* | (2009.01) | |
| *H04W 24/10* | (2009.01) | |
| *H04W 74/08* | (2009.01) | |
| *H04W 88/08* | (2009.01) | |

(52) U.S. Cl.
CPC ......... *H04W 74/006* (2013.01); *H04W 24/10* (2013.01); *H04W 74/004* (2013.01); *H04W 74/0833* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2016/0105853 A1 | 4/2016 | Zhao et al. | |
| 2018/0070369 A1* | 3/2018 | Papasakellariou | .... H04L 5/0053 |
| 2018/0132282 A1* | 5/2018 | Ly | ..................... H04W 28/0215 |

FOREIGN PATENT DOCUMENTS

WO  WO-2018136298 A1  7/2018

OTHER PUBLICATIONS

"International Application Serial No. PCT/US2018/013347, International Search Report dated Apr. 26, 2018", 3 pgs.
"International Application Serial No. PCT/US2018/013347, Written Opinion dated Apr. 26, 2018", 7 pgs.

(Continued)

*Primary Examiner* — Phuongchau Ba Nguyen
(74) *Attorney, Agent, or Firm* — Kowert, Hood, Munyon, Rankin & Goetzel, P.C.

(57) ABSTRACT

Fifth generation (5G) or New Radio (NR) networks may support multiple numerologies, different waveforms, and as well as transmission bandwidths and durations for that are specific for a particular user equipment (UE) to use for uplink transmissions to a next generation evolved Node B (gNB). Described herein are mechanisms by which a gNB may indicate the availability of an NR or 5G network to the UE and mechanisms by which a UE may indicate NR capability to the gNB.

25 Claims, 8 Drawing Sheets

(56) References Cited

OTHER PUBLICATIONS

CATT, "UE capability coordination for LTE and NR interworking", R2-166098, 3GPP TSG RAN WG2 Meeting #95bis, Kaohsiung, (Sep. 30, 2016), 1-4.
Intel Corporation, "UE capability signaling framework for NR", R2-1700323, 3GPP TSG-RAN WG2 NR Ad hoc, Spokane, USA, (Jan. 7, 2017), 1-7.
NTT Docomo, "RAN WG's progress on NR technology SI in the October meeting", R2168015, 3GPP TSG-RAN WG2 #96, Reno, USA, (Nov. 11, 2016), 1-30.
Samsung, "Bandwidth configurations for single carrier wideband operations in NR", R21700462, 3GPP TSG-RAN WG2 Nr Ad hoc, Spokane, USA, (Jan. 6, 2017), 1-5.

\* cited by examiner

ADVERTISEMENT OF NR CAPABILITY TO USER EQUIPMENT

PRIORITY CLAIM

This application is a U.S. National Stage Filing under 35 U.S.C. 371 from International Application No. PCT/US2018/013347, filed Jan. 11, 2018, which claims priority to U.S. Provisional Patent Application Ser. No. 62/448,146, filed Jan. 19, 2017, which are incorporated herein by reference in their entirety.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, 3GPP LTE-A (LTE Advanced), and 3GPP fifth generation (5G) or new radio (NR) networks, although the scope of the embodiments is not limited in this respect.

BACKGROUND

Mobile wireless communications systems have evolved from early voice-only systems to today's highly sophisticated integrated communication platforms in which fourth generation (4G) LTE networks provide data for massive mobile services. Next generation (a.k.a, fifth generation (5G) or new radio (NR)) technology is being developed to meet the increased future demands brought about by use cases such as enhanced mobile broadband, ultra-reliable and low-latency communications, and machine-to-machine communications for enabling the Internet of Things (IoT). 5G technology builds on a combination of existing 4G and new technologies to meet these demands. A concern of the present disclosure is the manner in which a mobile device learns of the availability of a 5G or NR network from a base station.

DETAILED DESCRIPTION

The next generation wireless communication system, 5G or new radio (NR), will provide access to information and sharing of data anywhere, anytime by various users and applications. NR is expected to be a unified network/system that supports vastly different and sometime conflicting performance dimensions and services. Such diverse multi-dimensional requirements are driven by different services and applications. To meet these requirements, NR provides for flexible resource allocations with respect to the waveform used to transmit data, waveform numerology, transmission bandwidth, and transmission duration.

In NR and LTE, a mobile terminal is referred to as user equipment (UE). A base station is referred to as an evolved Node B (eNB) in LTE and as a next generation eNB (gNB) in NR. In order for an NR UE to obtain initial access to the network and acquire uplink (UL) and downlink (DL) resources from the gNB, the UE performs a contention-based random access channel (RACH) procedure (also referred to simply as a random access procedure) that comprises four stages designated as messages 1 through 4. The RACH procedure is described in more detail below. As mentioned above, an NR UE may support multiple numerologies, different waveforms, and potential UE-specific transmission bandwidths and durations for uplink transmissions. Described herein are mechanisms by which a gNB may indicate the availability of an NR or 5G network to the UE and mechanisms by which a UE may indicate NR capability to the gNB.

Example Radio Architecture

Figure 1:
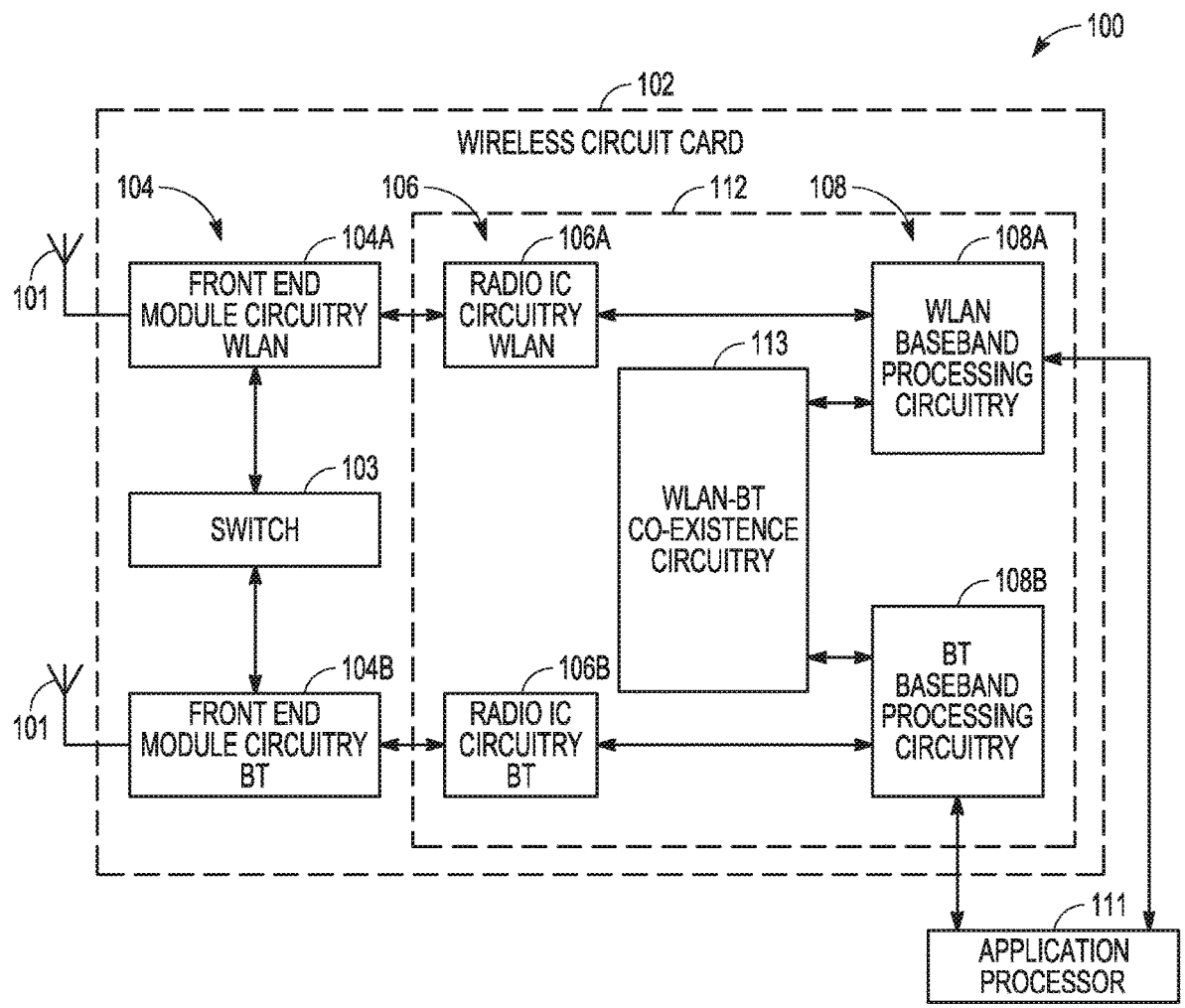
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104B may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106a may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
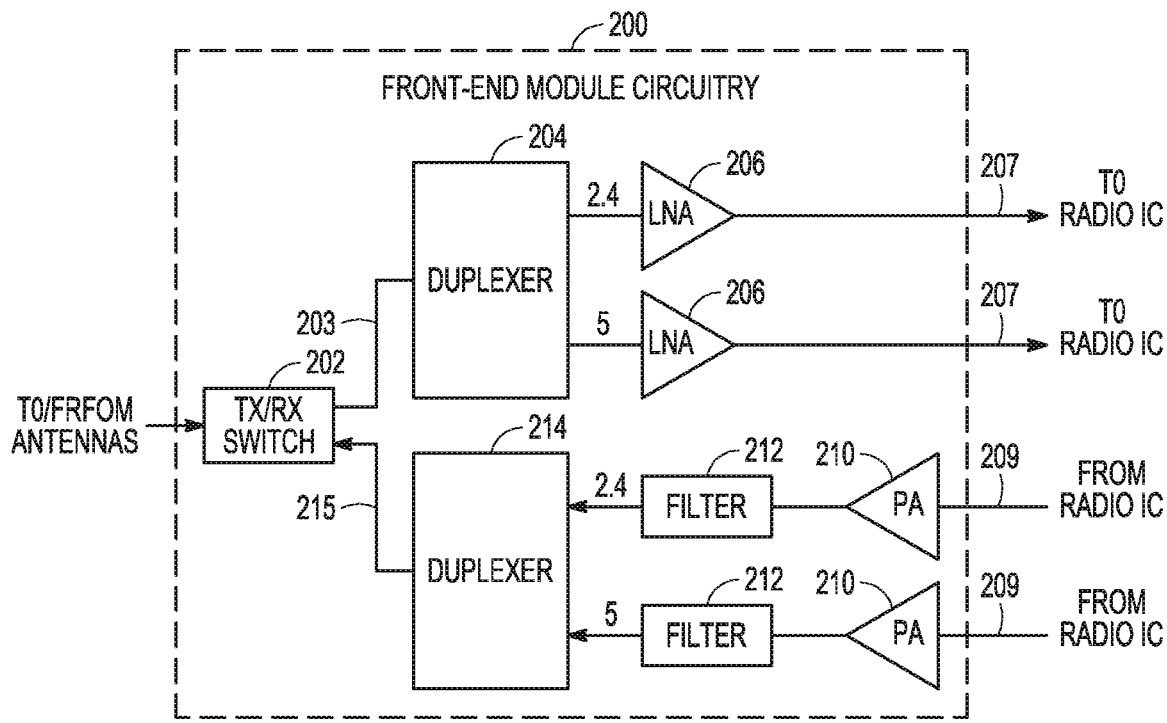
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
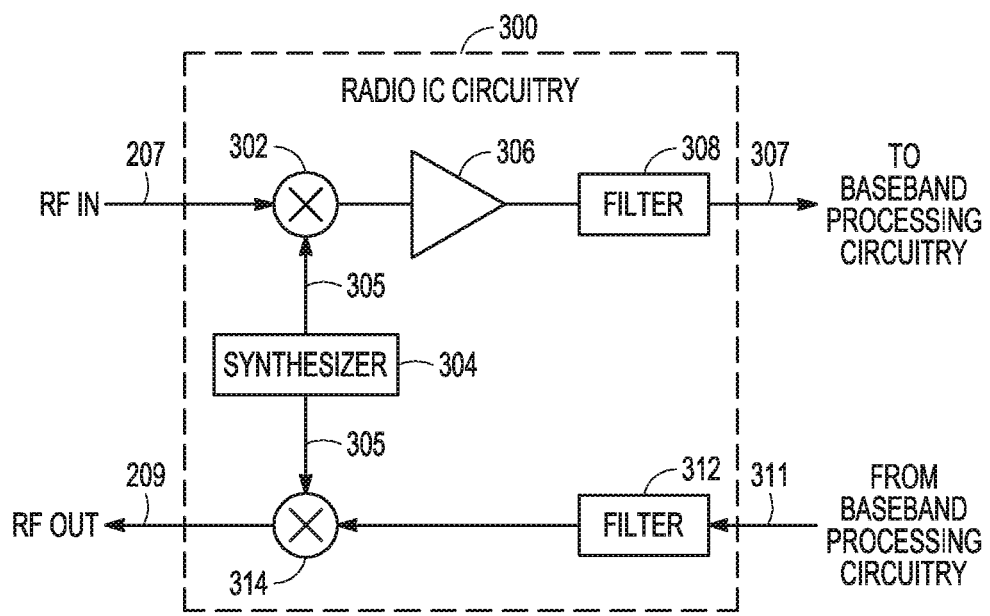
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
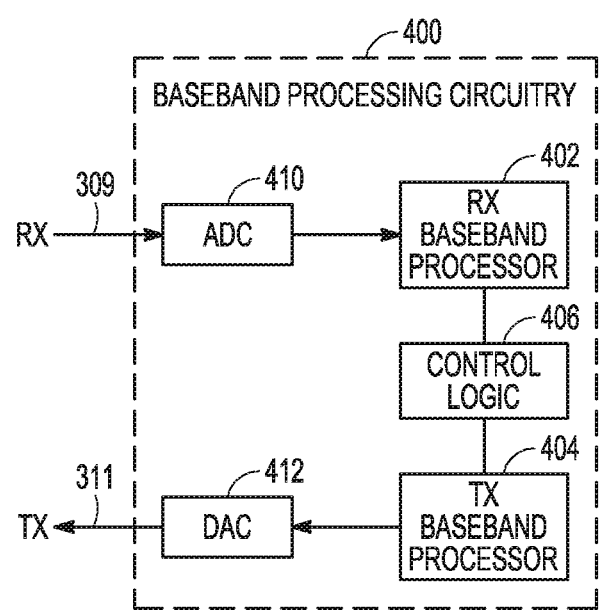
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example Machine Description

Figure 5:
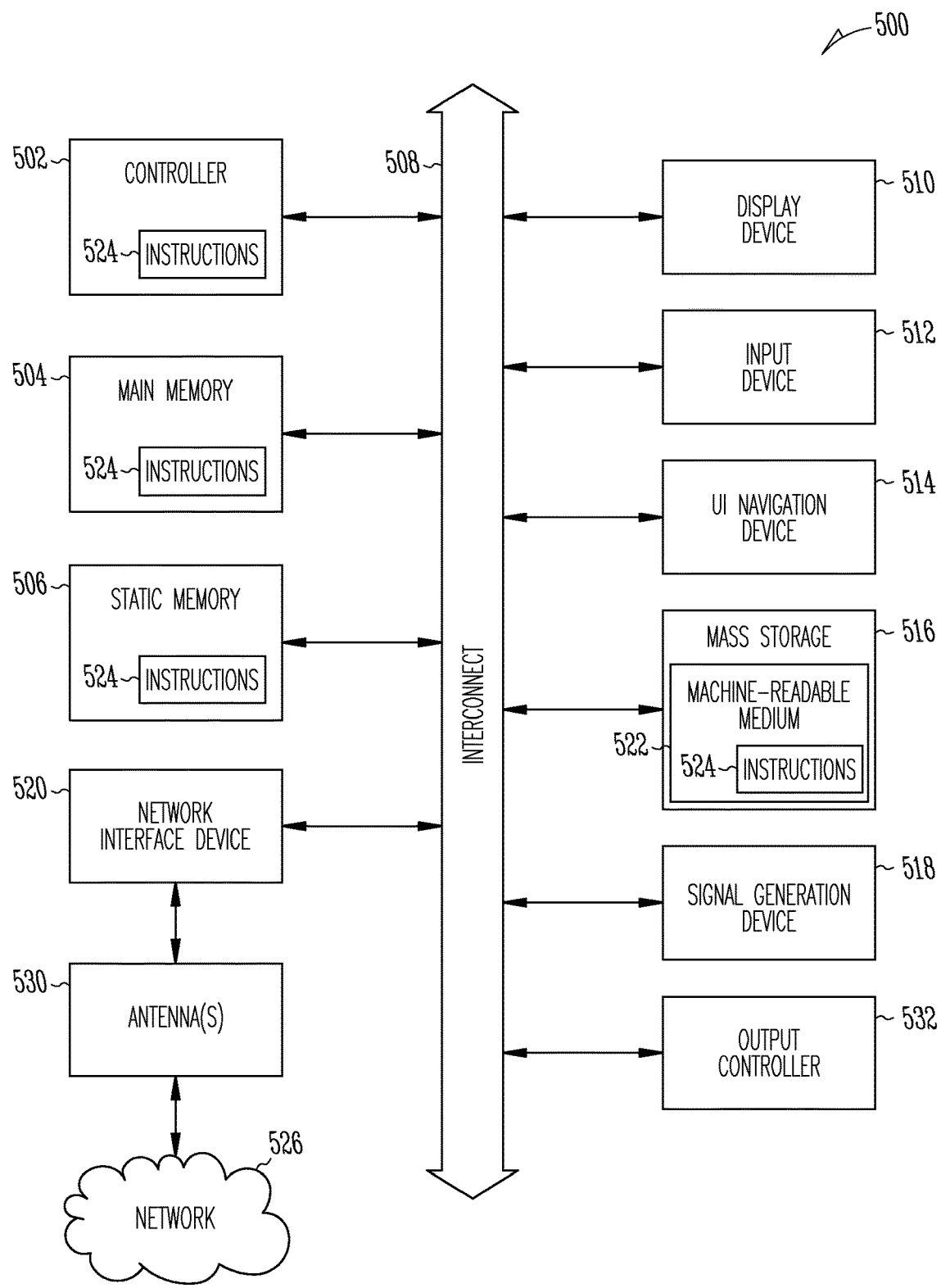
FIG. 5 illustrates an example of a computing machine such as an evolved Node B (eNB) or next generation evolved node B (gNB) according to some embodiments.

FIG. 5 illustrates a block diagram of an example machine 500 upon which any one or more of the techniques (e.g., methodologies) discussed herein may performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), next generation evolved Node B (gNB), next generation access network (AN), next generation user plane function (UPF), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding, or carrying instructions for execution by the machine 500, and includes digital or analog communications signals or other intangible medium to facilitate communication of such software.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
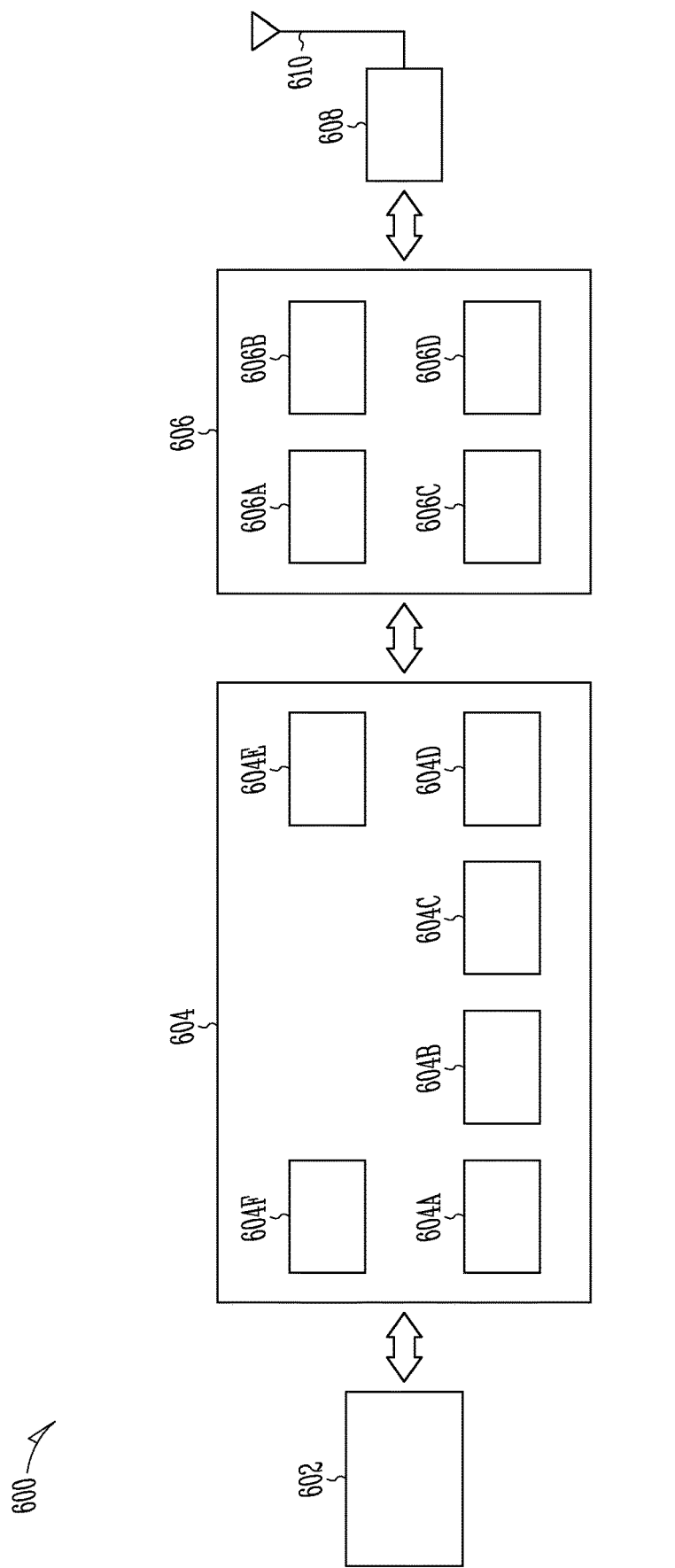
FIG. 6 illustrates an example of a user equipment (UE) device according to some embodiments.

Embodiments described herein may be implemented into a system using any suitably configured hardware and/or software. FIG. 6 illustrates, for one embodiment, example components of a User Equipment (UE) device 600. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the UE device 600 may include additional elements such as, for example, memory/storage, display, camera, sensor, and/or input/output (I/O) interface.

Descriptions of Embodiments

Figure 7:
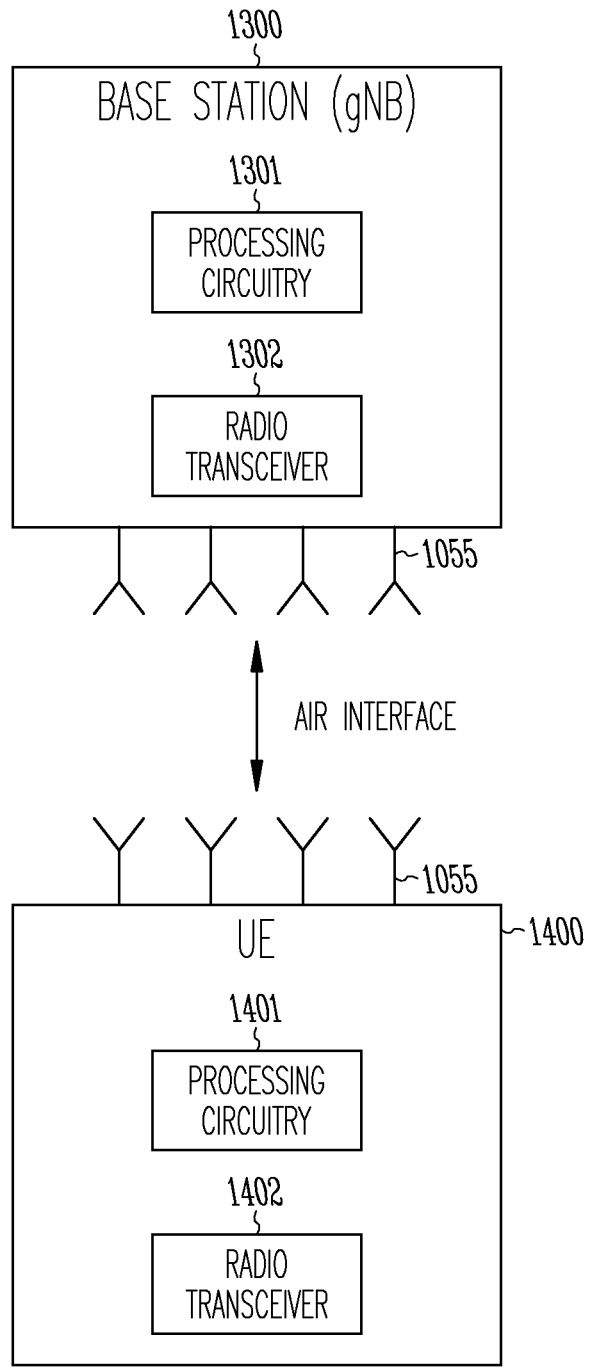
FIG. 7 illustrates an example UE and a base station (BS) such as an eNB or gNB according to some embodiments.

In Long Term Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 7 illustrates an example of the components of a UE 1400 and a base station (e.g., eNB or gNB) 1300. The BS 1300 includes processing circuitry 1301 connected to a radio transceiver 1302 for providing an air interface. The UE 1400 includes processing circuitry 1401 connected to a radio transceiver 1402 for providing an air interface over the wireless medium. Each of the transceivers in the devices is connected to antennas 1055. The memory and processing circuitries of the UE and/or BS may be configured to perform the functions and implement the schemes of the various embodiments described herein.

The air interface for NR and LTE, also referred to as the radio interface or radio access network (RAN), has a layered protocol architecture where peer layers of the UE and gNB pass protocol data units (PDUs) between each other that are encapsulated service data units (SDUs) of the next higher layer. The topmost layer in the user plane is the packet data compression protocol (PDCP) layer that transmits and receives IP (internet protocol) packets. The topmost layer of the control plane in the access stratum between the UE and gNB is the radio resource control (RRC) layer. The PDCP layer communicates with the radio link control (RLC) layer via radio bearers to which IP packets are mapped. At the medium access control (MAC) layer, the connection to the RLC layer above is through logical channels, and the connection to the physical layer below is through transport channels. The primary UL transport channel is the uplink shared channel (UL-SCH), and the primary DL transport channel is the downlink shared channel (DL-SCH). Another DL transport channel, the broadcast channel (BCH), is used by the gNB to broadcast system information. At the physical layer, the UL-SCH is associated with the physical uplink shared channel (PUSCH), the DL-SCH is associated with the physical downlink shared channel (PDSCH), and the BCH is associated with the physical broadcast channel (PBCH). The physical layer is referred to as layer 1 or L1. The MAC, RLC, and PDCP layers are referred to as layer 2 or L2. The RRC layer, as well as the non-access stratum (NAS) layer between the UE and the core network in the control plane and user applications in the user plane, are referred to layer 3 or L3.

Data on a transport channel is organized into transport blocks. In each transmission time interval (TTI), at most one transport block of dynamic size is transmitted over the radio interface to/from a device in the absence of spatial multiplexing. In the case of spatial multiplexing (MIMO), there can be up to two transport blocks per TTI. Among other things, the MAC layer provides functionality for performing the random access procedure as described below.

The waveform used in NR is cyclic prefix orthogonal frequency division multiplexing (CP-OFDM) for the downlink (DL) and either CP-OFDM or discrete Fourier transform spread OFDM (DFT-s-OFDM) for the uplink (UL). The CP-OFDM waveform can be can be used for single-stream and multi-stream (i.e., MIMO) transmissions, while the DFT-s-OFDM based waveform is limited to single-stream transmissions only (targeting cases with a limited link budget). The NR specifications make it mandatory for UEs to support both CP-OFDM and DFT-s-OFDM, where the gNB may communicate to the UE which of the CP-OFDM or DFT-s-OFDM waveforms the UE is to use for UL transmissions. Both of the CP-OFDM and DFT-s-OFDM waveforms may have variable numerologies (e.g., subcarrier spacing and symbol duration).

NR supports both frequency division duplex and time division duplex modes to separate UL transmissions from DL transmissions. The downlink and uplink transmissions are organized into radio frames each having a duration of 10 ms, and each radio frame consists of 10 subframes of 1 ms each. Each subframe contains a variable number of slots (e.g., either 7 or 14), and each slot contains a variable number of OFDM symbols depending upon the numerology and slot configuration. Data is encoded into by an inverse DFT into frequency-domain symbols that are transmitted as time-frequency resources. Each such time-frequency resource corresponds to a particular subcarrier of a particular OFDM symbol, referred to as a resource element (RE).

Figure 8:
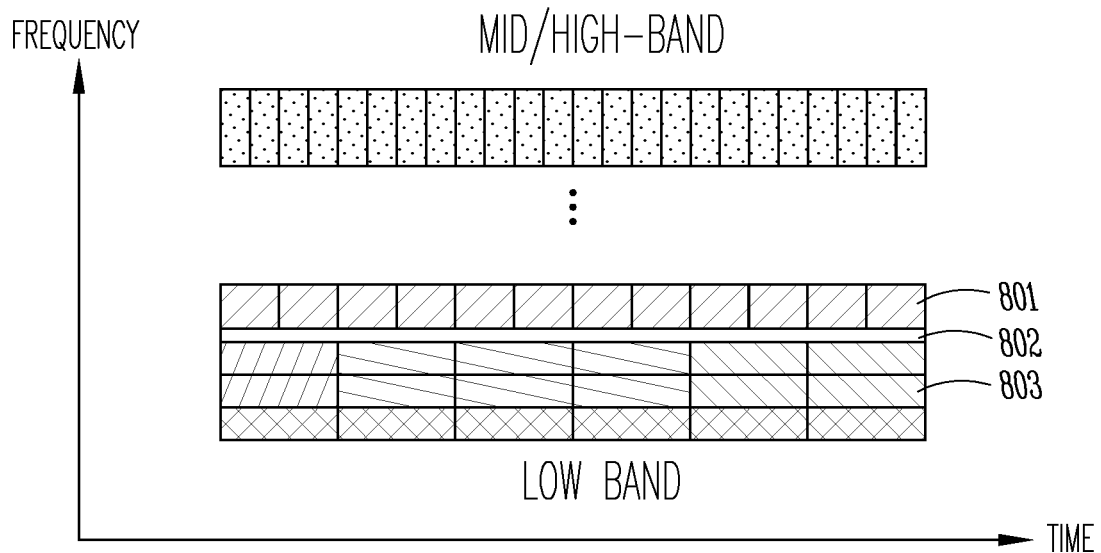
FIG. 8 illustrates an example of multiple partitions in the unified NR framework according to some embodiments.

NR defines a unified framework with flexible resource allocations for the support of diverse requirements, applications and services, multiple frequency bands, multiple application/services, licensed/unlicensed frequency, and multiple partitions. FIG. 8 illustrates such a unified framework for NR with multiple partitions. Multiple partitions or applications in different or same frequency resource or frequency bands can be multiplexed in either time-division multiplexing (TDM), frequency-division multiplexing (FDM), code-division multiplexing (CDM) manner or a combination thereof. FIG. 8 shows a short transmission time interval (TTI) partition 801 (such as may be used for mission critical machine-type communications (MTC), a long TTI partition 802 (such as may be used for massive MTC, and a normal TTI partition 803 (such as may be used for mobile broadband). Also, different partitions may employ different subcarrier spacings (i.e., different numerologies) for the CP-OFDM or DFT-s-OFDM waveforms that can be tailored for different applications and use cases.

When a UE is in an RRC connected state, all uplink and downlink resources are allocated by the gNB. At the physical level, those resources are segregated into separate physical channels. The gNB grants uplink resources over the PUSCH and downlink resources over the PDSCH using the physical downlink control channel (PDCCH), where an individual control message is referred to as downlink control information (DCI). The UE is allocated resources in the physical uplink control channel (PUCCH) for requesting resources for transmitting data to the eNB over the PUSCH. If the UE has not been allocated resources on the PUCCH for transmitting such a scheduling request, the UE may use a random access procedure for the scheduling request.

To initially access the network, the UE performs a contention-based random access channel (RACH) procedure. In order to perform the RACH procedure, the UE first needs to: 1) find and acquire synchronization to a cell within the network, and 2) receive and decode the information, referred to as the cell system information, needed to communicate with and operate properly within the cell. To assist in cell search and synchronization, two special signals are transmitted by the gNB: the primary synchronization signal (PSS) and the secondary synchronization signal (SSS).

System information is delivered by two different mechanisms relying on two different transport channels. In LTE and NR, a portion of the system information is transmitted in the form of a master information block (MIB) using the BCH and PBCH, while the main part of the system information is transmitted in the form of system information blocks (SIBs) over the DL-SCH and PDSCH. In LTE and NR system, specific time-frequency resources are reserved for use by UEs in performing the RACH procedure, referred to as the physical random access channel (PRACH). The location of the PRACH in the time-frequency grid is broadcast to UEs in an SIB.

Figure 9:
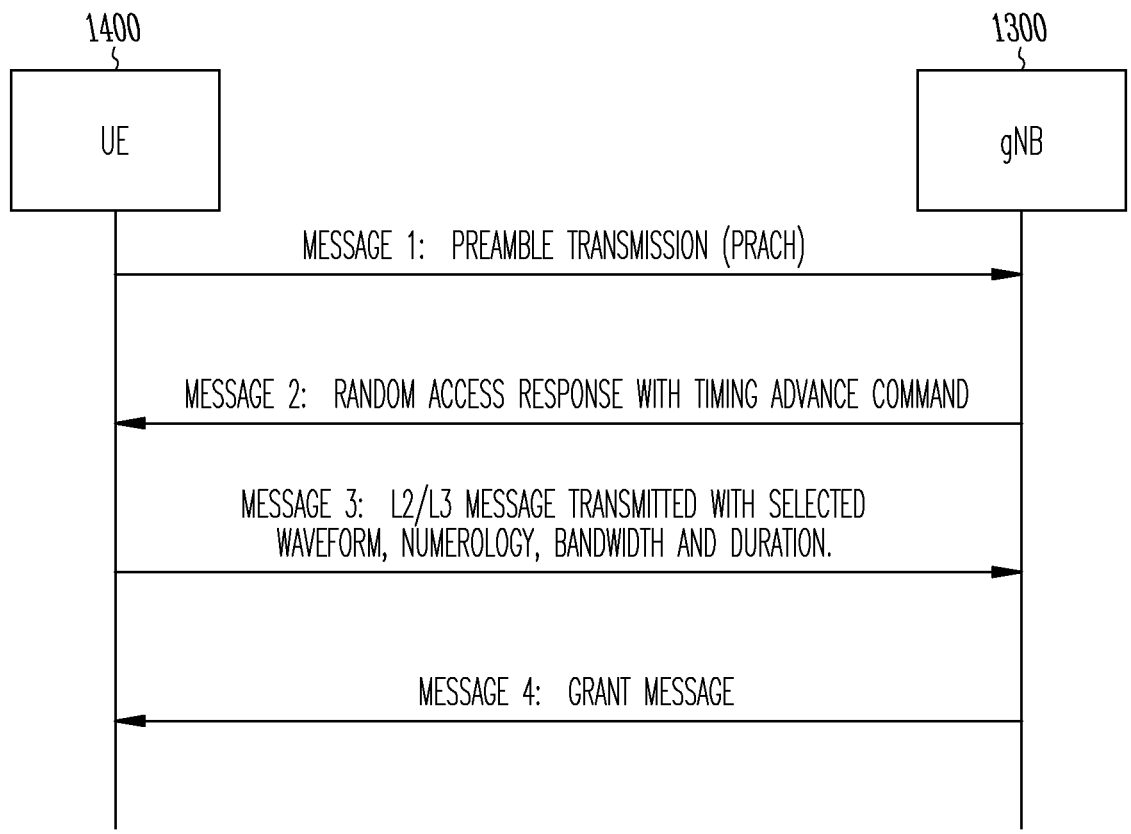
FIG. 9 illustrates an example of a random access procedure for obtaining initial access to an NR network according to some embodiments.

FIG. 9 illustrates the stages of a contention-based RACH procedure for obtaining initial according to some embodiments. The RACH procedure begins when the UE 1400, after acquiring synchronization and system information, transmits a random access preamble on the physical random access channel (PRACH) to the gNB 1300, referred to as message 1. The preamble transmission indicates to the gNB the presence of a UE performing a random access procedure and also allows the gNB to estimate the transmission delay between the UE and gNB for adjusting the uplink timing. The gNB responds with a random access response (RAR) over the PDCCH, referred to as message 2, using a random access-RNTI (RA-RNTI) to address the UE. Message 2 also includes a timing advance command. The UE expects to receive the RAR within a time window, of which the start and end are configured by the gNB via a system information block (SIB). The RA-RNTI may be derived from the specific time-frequency resources that the UE selects for transmitting message 1. The UE then transmits an L2/L3 message with adjusted timing, referred to as message 3, to the gNB using a PUSCH resource assigned to the UE by message 2. Message 3 includes a UE identification as well as other content such as an RRC connection request. The gNB then transmits a grant message referred to as message 4 to the UE that resolves any contention due to multiple UEs performing a random access procedure using the same preamble and receiving the same random access response from the gNB. If the random access procedure is successful, the UE is granted uplink resources.

Figure 10:
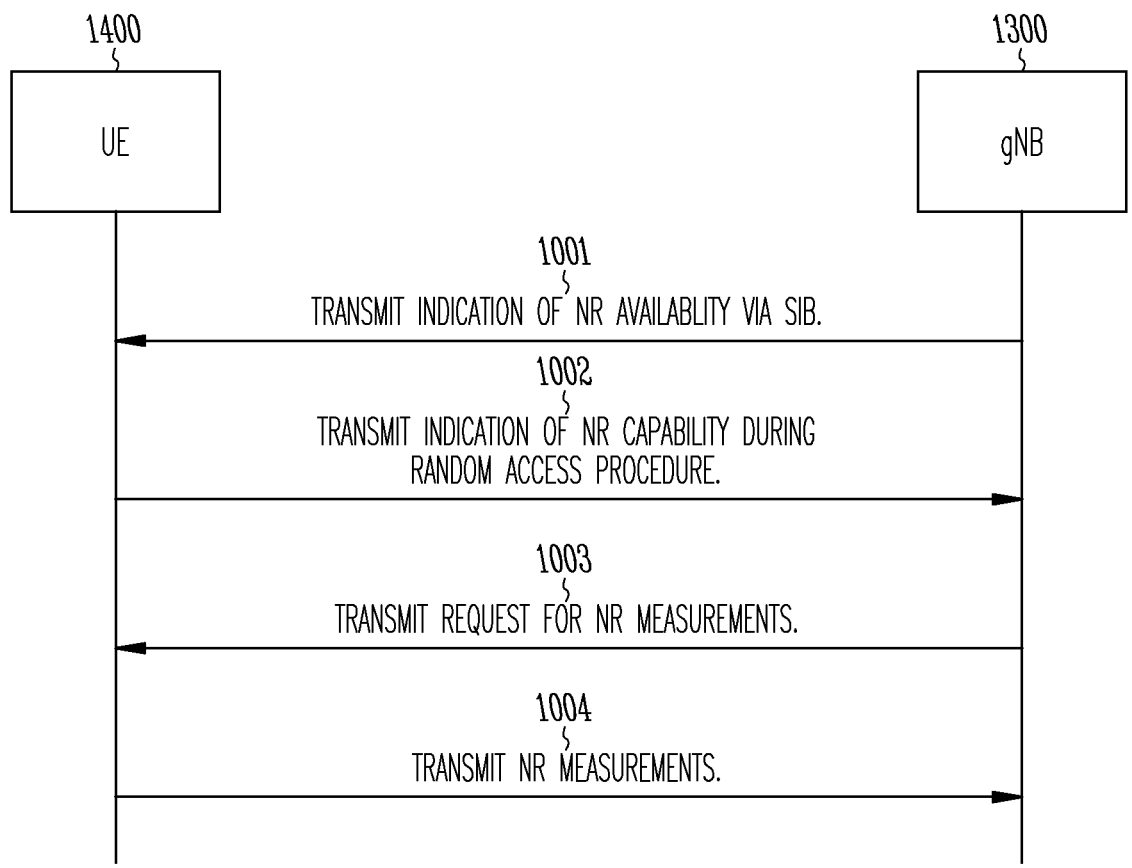
FIG. 10 illustrates a scheme by which a gNB advertises NR availability to a UE according to some embodiments.

FIG. 10 illustrates a scheme by which a gNB 1300 advertises NR availability to a UE 1400 and by which the UE responds to the gNB as whether it has NR capability according to one embodiment. NR availability or capability may include one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using for UE-specific durations for UL transmissions. At stage 1001, the gNB transmits an indication of NR availability to the UE via an SIB transmitted over the PDSCH. At stage, 1002, the UE transmits an indication of NR capability to the gNB in a message transmitted during a random access procedure performed to gain initial access to the network. The indication of NR capability may, for example, be transmitted in message 1 or message 3. In one embodiment, the indication of NR capability is encoded as a function of a selected physical random access channel (PRACH) resource used to transmit a preamble during the random access procedure. Upon receipt of the NR capability message and after the random access procedure has been completed so that the UE is in an RRC connected state, the gNB requests at stage 1003 the UE perform NR measurements such as a path loss measurement based on, for example, primary or secondary synchronization signals (PSS or SSS) or channel state information reference signals (CSI-RS). At stage 1004, the UE transmits the NR measurements to the gNB.

In other embodiments, the gNB may advertise NR availability to the UE, and the UE may respond to the gNB as whether it has NR capability, after initial network access has been completed so that the UE is in an RRC connected state. In these embodiments, RRC signaling may be employed to inform the UE that NR is available. The UE may then respond via RRC signaling as to whether it has NR capability.

Additional Notes and Examples

In Example 1, an apparatus for a next generation evolved Node B (gNB), the apparatus comprises: memory and processing circuitry; wherein the processing circuitry is to: encode an indication of New Radio (NR) availability for transmission to user equipments (UEs); decode an indication from a UE as to whether or not the UE has NR capability sent in response to the indication of NR availability; and, store the indication of NR capability in memory.

In Example 2, the subject matter of Example 1 or any of the Examples herein may optionally include wherein NR availability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using UE-specific durations for UL transmissions In Example 3, the subject matter of Example 1 or any of the Examples herein may optionally include wherein the processing circuitry is further to encode the indication of NR availability in a system information block (SIB) for transmission over a physical downlink shared channel (PDSCH).

In Example 4, the subject matter of Example 1 or any of the Examples herein may optionally include wherein the processing circuitry is further to encode the indication of NR availability in a message for transmission to a UE during a random access procedure.

In Example 5, the subject matter of Example 1 or any of the Examples herein may optionally include wherein the processing circuitry is further to encode the indication of NR availability to a UE in a radio resource control (RRC) connected state via RRC signaling.

In Example 6, the subject matter of Example 1 or any of the Examples herein may optionally include wherein the processing circuitry is further to decode the indication from the UE as to whether the UE has NR capability in a message transmitted from the UE during a random access procedure.

In Example 7, the subject matter of Example 1 or any of the Examples herein may optionally include wherein the processing circuitry is further to, when the UE indicates NR capability, encode a message to the UE requesting measurement of a path loss for transmissions between the gNB and the UE.

In Example 8, the subject matter of Example 7 or any of the Examples herein may optionally include wherein the encoded message to the UE requesting a path loss measurement specifies that the UE is to perform the measurement using signals transmitted over a physical broadcast channel (PBCH).

In Example 9, the subject matter of Example 7 or any of the Examples herein may optionally include wherein the encoded message to the UE requesting a path loss measurement specifies that the UE is to perform the measurement using primary synchronization signals (PSS) or secondary synchronization signals (SSS) transmitted by the gNB.

In Example 10, the subject matter of Example 1 or any of the Examples herein may optionally include wherein the encoded message to the UE requesting a path loss measurement specifies that the UE is to perform the measurement using channel state information reference signals (CSI-RS) transmitted by the gNB.

In Example 11, an apparatus for a user equipment (UE), the apparatus comprises: memory and processing circuitry; wherein the processing circuitry is to: store an indication as to whether the UE has New Radio (NR) capability in memory; decode an indication as to whether an evolved Node B (eNB) or next generation evolved Node B (gNB) has NR availability based on signals transmitted by the eNB or gNB; and, encode the indication as to whether the UE has NR capability for transmission to an evolved Node B (eNB) or next generation evolved Node B (gNB).

In Example 12, the subject matter of Example 11 or any of the Examples herein may optionally include wherein NR capability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using for UE-specific durations for UL transmissions.

In Example 13, the subject matter of Example 11 or any of the Examples herein may optionally include wherein the processing circuitry is to encode the indication as to whether the UE has NR capability in a message for transmission during a random access procedure.

In Example 14, the subject matter of Example 11 or any of the Examples herein may optionally include wherein the processing circuitry is to encode the indication as to whether the UE has NR capability as a function of a selected physical random access channel (PRACH) resource used to transmit a preamble during a random access procedure.

In Example 15, the subject matter of Example 11 or any of the Examples herein may optionally include wherein the processing circuitry is to encode the indication as to whether the UE has NR capability for transmission via radio resource control (RRC) signaling while in an RRC connected state.

In Example 16, the subject matter of Example 11 or any of the Examples herein may optionally include wherein the processing circuitry is to decode an indication as to whether an evolved Node B (eNB) or next generation evolved Node B (gNB) has NR availability based on a system information block (SIB) transmitted by the eNB or gNB.

In Example 17, the subject matter of Example 11 or any of the Examples herein may optionally include wherein the processing circuitry is to decode an indication as to whether an evolved Node B (eNB) or next generation evolved Node B (gNB) has NR availability based on radio resource control (RRC) messages received while in an RRC connected state.

In Example 18, the subject matter of Example 11 or any of the Examples herein may optionally include wherein, when the gNB indicates NR availability, the processing circuitry is further to: decode a message from the gNB requesting measurement of a path loss for transmissions between the gNB and the UE; perform the path loss measurement; and encode the path loss measurement for transmission to the gNB.

In Example 19, the subject matter of Example 18 or any of the Examples herein may optionally include wherein the processing circuitry is to perform the path loss measurement using primary synchronization signals (PSS) or secondary synchronization signals (SSS) transmitted by the gNB.

In Example 20, the subject matter of Example 18 or any of the Examples herein may optionally include wherein the processing circuitry is to perform the path loss measurement using channel state information reference signals (CSI-RS) transmitted by the gNB.

In Example 21, a computer-readable storage medium comprises instructions to cause processing circuitry of a user equipment (UE), upon execution of the instructions by the processing circuitry, to: store an indication as to whether the UE has New Radio (NR) capability in memory; decode an indication as to whether an evolved Node B (eNB) or next generation evolved Node B (gNB) has NR availability based on signals transmitted by the eNB or gNB; and, encode the indication as to whether the UE has NR capability for transmission to an evolved Node B (eNB) or next generation evolved Node B (gNB).

In Example 22, the subject matter of Example 21 or any of the Examples herein may optionally include wherein NR capability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using for UE-specific durations for UL transmissions In Example 23, the subject matter of Example 21 or any of the Examples herein may optionally include instructions to encode the indication as to whether the UE has NR capability in a message for transmission during a random access procedure.

In Example 24, the subject matter of Example 21 or any of the Examples herein may optionally include instructions to encode the indication as to whether the UE has NR capability as a function of a selected physical random access channel (PRACH) resource used to transmit a preamble during a random access procedure.

In Example 25, the subject matter of Example 21 or any of the Examples herein may optionally include instructions to decode an indication as to whether an evolved Node B (eNB) or next generation evolved Node B (gNB) has NR availability based on a system information block (SIB) transmitted by the eNB or gNB.

In Example 26, the subject matter of Example 21 or any of the Examples herein may optionally include instructions to encode the indication as to whether the UE has NR capability for transmission via radio resource control (RRC) signaling while in an RRC connected state.

In Example 27, the subject matter of Example 21 or any of the Examples herein may optionally include instructions to decode an indication as to whether an evolved Node B (eNB) or next generation evolved Node B (gNB) has NR availability based on radio resource control (RRC) messages received while in an RRC connected state.

In Example 28, the subject matter of Example 21 or any of the Examples herein may optionally include instructions to, when the gNB indicates NR availability: decode a message from the gNB requesting measurement of a path loss for transmissions between the gNB and the UE; perform the path loss measurement; and encode the path loss measurement for transmission to the gNB.

In Example 29, the subject matter of Example 21 or any of the Examples herein may optionally include instructions to perform the path loss measurement using primary synchronization signals (PSS) or secondary synchronization signals (SSS) transmitted by the gNB.

In Example 30, the subject matter of Example 21 or any of the Examples herein may optionally include instructions to perform the path loss measurement using channel state information reference signals (CSI-RS) transmitted by the gNB.

In Example 31, a computer-readable storage medium comprising instructions to cause processing circuitry of a next generation evolved Node B (gNB), upon execution of the instructions by the processing circuitry, to: encode an indication of New Radio (NR) availability for transmission to user equipments (UEs); and, decode an indication from a UE as to whether or not the UE has NR capability sent in response to the indication of NR availability; and, store the indication of NR capability in memory.

In Example 32, the subject matter of Example 31 or any of the Examples herein may optionally include wherein NR availability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using UE-specific durations for UL transmissions In Example 33, the subject matter of Example 31 or any of the Examples herein may optionally include instructions to encode the indication of NR availability in a system information block (SIB) for transmission over a physical downlink shared channel (PDSCH).

In Example 34, the subject matter of Example 31 or any of the Examples herein may optionally include instructions to encode the indication of NR availability in a message for transmission to the UE during a random access procedure.

In Example 35, the subject matter of Example 31 or any of the Examples herein may optionally include instructions to encode the indication of NR availability to the UE in a radio resource control (RRC) connected state via RRC signaling.

In Example 36, the subject matter of Example 31 or any of the Examples herein may optionally include instructions to decode the indication from the UE as to whether the UE has NR capability in a message transmitted from the UE during a random access procedure.

In Example 37, the subject matter of Example 31 or any of the Examples herein may optionally include instructions to, when the UE indicates NR capability, encode a message to the UE requesting measurement of a path loss for transmissions between the gNB and the UE.

In Example 38, the subject matter of Example 31 or any of the Examples herein may optionally include wherein the encoded message to the UE requesting a path loss measurement specifies that the UE is to perform the measurement using signals transmitted over a physical broadcast channel (PBCH).

In Example 39, the subject matter of Example 37 or any of the Examples herein may optionally include wherein the encoded message to the UE requesting a path loss measurement specifies that the UE is to perform the measurement using primary synchronization signals (PSS) or secondary synchronization signals (SSS) transmitted by the gNB.

In Example 40, the subject matter of Example 37 or any of the Examples herein may optionally include wherein the encoded message to the UE requesting a path loss measurement specifies that the UE is to perform the measurement using channel state information reference signals (CSI-RS) transmitted by the gNB.

In Example 41, a method for operating a next generation evolved Node B (gNB), comprises: encoding an indication of New Radio (NR) availability for transmission to user equipments (UEs); decoding an indication from a UE as to whether or not the UE has NR capability sent in response to the indication of NR availability; and, storing the indication of NR capability in memory.

In Example 42, the subject matter of Example 41 or any of the Examples herein may optionally include wherein NR availability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using UE-specific durations for UL transmissions In Example 43, the subject matter of Example 41 or any of the Examples herein may optionally include encoding the indication of NR availability in a system information block (SIB) for transmission over a physical downlink shared channel (PDSCH).

In Example 44, the subject matter of Example 41 or any of the Examples herein may optionally include encoding the indication of NR availability in a message for transmission to the UE during a random access procedure.

In Example 45, the subject matter of Example 41 or any of the Examples herein may optionally include encoding the indication of NR availability to the UE in a radio resource control (RRC) connected state via RRC signaling.

In Example 46, the subject matter of Example 41 or any of the Examples herein may optionally include decoding the indication from the UE as to whether the UE has NR capability in a message transmitted from the UE during a random access procedure.

In Example 47, the subject matter of Example 41 or any of the Examples herein may optionally include, when the UE indicates NR capability, encoding a message to the UE requesting measurement of a path loss for transmissions between the gNB and the UE.

In Example 48, the subject matter of Example 41 or any of the Examples herein may optionally include wherein the encoded message to the UE requesting a path loss measurement specifies that the UE is to perform the measurement using signals transmitted over a physical broadcast channel (PBCH).

In Example 49, the subject matter of Example 41 or any of the Examples herein may optionally include wherein the encoded message to the UE requesting a path loss measurement specifies that the UE is to perform the measurement using primary synchronization signals (PSS) or secondary synchronization signals (SSS) transmitted by the gNB.

In Example 50, the subject matter of Example 41 or any of the Examples herein may optionally include wherein the encoded message to the UE requesting a path loss measurement specifies that the UE is to perform the measurement using channel state information reference signals (CSI-RS) transmitted by the gNB.

In Example 51, a method for operating a user equipment (UE), the comprising: storing an indication as to whether the UE has New Radio (NR) capability in memory; decoding an indication as to whether an evolved Node B (eNB) or next generation evolved Node B (gNB) has NR availability based on signals transmitted by the eNB or gNB; and, encoding the indication as to whether the UE has NR capability for transmission to an evolved Node B (eNB) or next generation evolved Node B (gNB).

In Example 52, the subject matter of Example 51 or any of the Examples herein may optionally include wherein NR capability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using for UE-specific durations for UL transmissions In Example 53, the subject matter of Example 51 or any of the Examples herein may optionally include encoding the indication as to whether the UE has NR capability in a message for transmission during a random access procedure.

In Example 54, the subject matter of Example 51 or any of the Examples herein may optionally include encoding the indication as to whether the UE has NR capability as a function of a selected physical random access channel (PRACH) resource used to transmit a preamble during a random access procedure.

In Example 55, the subject matter of Example 51 or any of the Examples herein may optionally include encoding the indication as to whether the UE has NR capability for transmission via radio resource control (RRC) signaling while in an RRC connected state.

In Example 56, the subject matter of Example 51 or any of the Examples herein may optionally include decoding an indication as to whether an evolved Node B (eNB) or next generation evolved Node B (gNB) has NR availability based on a system information block (SIB) transmitted by the eNB or gNB.

In Example 57, the subject matter of Example 51 or any of the Examples herein may optionally include decoding an indication as to whether an evolved Node B (eNB) or next generation evolved Node B (gNB) has NR availability based on radio resource control (RRC) messages received while in an RRC connected state.

In Example 58, the subject matter of Example 51 or any of the Examples herein may optionally include wherein, when the gNB indicates NR availability, further comprising: decoding a message from the gNB requesting measurement of a path loss for transmissions between the gNB and the UE; performing the path loss measurement; and encoding the path loss measurement for transmission to the gNB.

In Example 59, the subject matter of Example 51 or any of the Examples herein may optionally include performing the path loss measurement using primary synchronization signals (PSS) or secondary synchronization signals (SSS) transmitted by the gNB.

In Example 60, the subject matter of Example 51 or any of the Examples herein may optionally include performing the path loss measurement using channel state information reference signals (CSI-RS) transmitted by the gNB.

Example 61 is an apparatus for a next generation evolved Node B (gNB), the apparatus comprising means for performing the methods recited by any of Examples 41 through 50.

Example 62 is an apparatus for a user equipment (UE), the apparatus comprising means for performing the methods recited by any of Examples 51 through 60.

In Example 63, a computer-readable storage medium comprises instructions to cause a UE or gNB, upon execution of the instructions by the memory and processing circuitry of the UE or gNB, to perform the functions of the memory and/or processing circuitry as recited by any of the Examples herein In Example 64, the subject matter of any of the Examples herein may optionally include a radio transceiver having one or more antennas connected to the processing circuitry.

In Example 65, a method for operating a UE or gNB comprises performing any of the functions of the processing circuitry and/or radio transceiver as recited by any of the Examples herein.

In Example 66, an apparatus for a UE or gNB comprises means for performing any of the functions of the processing circuitry and/or radio transceiver as recited by any of the Examples herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus comprising:
one or more processors, wherein the one or more processors are configured to cause a next generation evolved Node B (gNB) to:
encode an indication of New Radio (NR) availability for transmission to user equipments (UEs);
decode an indication from a UE as to whether or not the UE has NR capability sent in response to the indication of NR availability; and
when the UE indicates NR capability, encode a message to the UE requesting measurement of transmissions between the gNB and the UE.

2. The apparatus of claim 1, wherein NR availability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using UE-specific durations for UL transmissions.

3. The apparatus of claim 1, wherein the one or more processors are further configured to encode the indication of NR availability in a system information block (SIB) for transmission over a physical downlink shared channel (PDSCH).

4. The apparatus of claim 1, wherein the one or more processors are further configured to encode the indication of NR availability in a message for transmission to the UE during a random access procedure.

5. The apparatus of claim 1, wherein the one or more processors are further configured to encode the indication of NR availability to the UE in a radio resource control (RRC) connected state via RRC signaling.

6. The apparatus of claim 1, wherein the processing circuitry is further to decode the indication from the HE as to whether the HE has NR capability in a message transmitted from the LIE during a random access procedure.

7. The apparatus of claim 1, wherein the one or more processors are further configured to, when the UE indicates NR capability, encode a message to the UE requesting measurement of a path loss for transmissions between the gNB and the UE.

8. The apparatus of claim 7, wherein the encoded message to the UE requesting a path loss measurement specifies that the UE is to perform the measurement using signals transmitted over a physical broadcast channel (PBCH).

9. The apparatus of claim 7, wherein the encoded message to the HE requesting a path loss measurement specifies that the UE is to perform the measurement using primary synchronization signals (PSS) or secondary synchronization signals (SSS) transmitted by the gNB.

10. The apparatus of claim 7, wherein the encoded message to the UE requesting a path loss measurement specifies that the UE is to perform the measurement using channel state information reference signals (CSI-RS) transmitted by the gNB.

11. An apparatus comprising:
one or more processors, wherein the one or more processors are configured to cause a user equipment (UE) to:

store an indication as to whether the UE has New Radio (NR) capability in memory;

decode an indication as to whether NR is available based on signals transmitted by an evolved Node B (eNB);

encode, in response to the indication of NR availability, the indication as to whether the UE has NR capability for transmission to an eNB; and in response to indicating the UE has NR capability, decode a message requesting measurement of transmissions between the gNB and the UE.

12. The apparatus of claim 11, wherein NR capability includes one or more of: options for using orthogonal frequency division multiplexing (OFDM) downlink (DL) and uplink (UL) waveforms with selected subcarrier spacings, an option for using either OFDM or discrete Fourier transform in spread OFDM (DFT-s-OFDM) waveforms for UL transmissions, options for using UE-specific bandwidths for UL transmissions, and options for using UE-specific durations for UL transmissions.

13. The apparatus of claim 11, wherein the one or more processors are further configured to encode the indication as to whether the UE has NR capability in a message for transmission during a random access procedure.

14. The apparatus of claim 11, wherein the one or more processors are further configured to encode the indication as to whether the UE has NR capability as a function of a selected physical random access channel (PRAM) resource used to transmit a preamble during a random access procedure.

15. The apparatus of claim 11, wherein the one or more processors are further configured to encode the indication as to whether the UE has NR capability for transmission via radio resource control (RRC) signaling while in an RRC connected state.

16. The apparatus of claim 11, wherein the one or more processors are further configured to decode an indication as to whether an eNB has NR availability based on a system information block (SIB) transmitted by the eNB.

17. The apparatus of claim 11, wherein the one or more processors are further configured to decode an indication as to whether an eNB has NR availability based on radio resource control (RRC) messages received while in an RRC connected state.

18. The apparatus of claim 11, wherein, when the eNB indicates NR availability, the one or more processors are further configured to:

decode a message from the eNB requesting measurement of a path loss for transmissions between the eNB and the UE;

perform the path loss measurement; and encode the path loss measurement for transmission to the eNB.

19. The apparatus of claim 18, wherein the one or more processors are further configured to perform the path loss measurement using primary synchronization signals (PSS) or secondary synchronization signals (SSS) transmitted by the eNB.

20. The apparatus of claim 18, wherein the one or more processors are further configured to perform the path loss measurement using channel state information reference signals (CSI-RS) transmitted by the eNB.

21. A user equipment (UE), comprising:
wireless communication circuitry; and
one or more processors coupled to the wireless communication circuitry, wherein the one or more processors are configured to cause the UE to:
store an indication that the UE has New Radio (NR) capability in memory;
decode an indication that NR is available based on signals transmitted by an evolved Node B (eNB);
encode, in response to the indication of NR availability, the indication as to whether the UE has NR capability for transmission to an eNB; and
in response to the indication that the UE has NR capability, decode a message requesting measurement of transmissions between the gNB and the UE.

22. The UE of claim 21, wherein NR capability includes one or more of: options for using orthogonal frequency division multiplexing (OFDM) downlink (DL) and uplink (UL) waveforms with selected subcarrier spacings, an option for using either OFDM or discrete Fourier transform spread OFDM (DFT-s-OFDM) waveforms for UL transmissions, options for using UE-specific bandwidths for UL transmissions, and options for using UE-specific durations for UL transmissions.

23. The UE of claim 21, wherein the one or more processors are further configured to encode the indication as to whether the UE has NR capability in a message for transmission during a random access procedure.

24. The UE of claim 21, wherein the one or more processors are further configured to encode the indication as to whether the UE has NR capability as a function of a selected physical random access channel (PRACH) resource used to transmit a preamble during a random access procedure.

25. The UE of claim 21, wherein the one or more processors are further configured to decode an indication as to whether an eNB has NR availability based on a system information block (SIB) transmitted by the eNB.

* * * * *